United States Patent
Schäufler et al.

(10) Patent No.: US 10,926,614 B2
(45) Date of Patent: Feb. 23, 2021

(54) ROOF ARRANGEMENT FOR A VEHICLE ROOF, AND VEHICLE ROOF HAVING A ROOF OPENING

(71) Applicant: Webasto SE, Stockdorf (DE)

(72) Inventors: Stefan Schäufler, Stockdorf (DE); Matthias Frank, Stockdorf (DE); Reinhard Wenzel, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 4 days.

(21) Appl. No.: 16/290,318

(22) Filed: Mar. 1, 2019

(65) Prior Publication Data
US 2019/0275871 A1  Sep. 12, 2019

(30) Foreign Application Priority Data
Mar. 6, 2018  (DE) .................... 10 2018 105 069

(51) Int. Cl.
*B60J 10/25* (2016.01)
*B60J 10/82* (2016.01)
*B60J 10/248* (2016.01)
*B60J 10/32* (2016.01)

(52) U.S. Cl.
CPC ............ *B60J 10/25* (2016.02); *B60J 10/248* (2016.02); *B60J 10/82* (2016.02); *B60J 10/32* (2016.02)

(58) Field of Classification Search
CPC ............... B60J 10/25; B60J 10/10248; B60J 10/10277; B60J 10/82; B60J 10/248; B60J 10/277
USPC ........................................ 296/216.06–216.09
See application file for complete search history.

(56) References Cited

U.S. PATENT DOCUMENTS

| | | | | |
|---|---|---|---|---|
| 5,366,267 A | * | 11/1994 | Nozaki | B60J 10/82 296/216.09 |
| 6,375,254 B1 | * | 4/2002 | Patz | B60J 10/16 296/215 |
| 2001/0033097 A1 | * | 10/2001 | Nozaki | B60J 10/235 296/216.09 |
| 2008/0217964 A1 | * | 9/2008 | Katayama | B60J 10/235 296/213 |
| 2017/0015184 A1 | | 1/2017 | Sawada | |

FOREIGN PATENT DOCUMENTS

DE     102016112579 B3     8/2017

* cited by examiner

*Primary Examiner* — Dennis H Pedder
(74) *Attorney, Agent, or Firm* — Fitch, Even, Tabin & Flannery, LLP

(57) ABSTRACT

A roof arrangement for a vehicle roof with a movable roof element and underlying frame with a seal hose having a strand shaped seal profile having a drain lip extending below an uppermost web of the frame.

10 Claims, 3 Drawing Sheets

ROOF ARRANGEMENT FOR A VEHICLE ROOF, AND VEHICLE ROOF HAVING A ROOF OPENING

CROSS-REFERENCE TO RELATED APPLICATIONS

This application claims priority from German Patent Application Number DE 10 2018 105 069.0, filed Mar. 6, 2018, which is hereby incorporated herein by reference in its entirety for all purposes.

The invention relates to a roof arrangement for a vehicle roof, in particular for a vehicle roof having a movable roof element. Furthermore, the invention relates to a vehicle roof having a roof opening of this type.

A vehicle roof of a motor vehicle can have a roof opening which is closed by a movable roof element and is selectively opened at least partially. A seal is provided, for example, for sealing the vehicle roof with respect to the movable roof element. The said seal is intended to avoid penetrating water from passing into a dry region of the vehicle roof and/or the motor vehicle.

It is desirable to specify a roof arrangement which makes reliable sealing possible. In addition, it is desirable to specify a vehicle roof having a roof arrangement of this type, which vehicle roof can be sealed reliably.

According to one aspect, a roof arrangement for a vehicle roof having a roof opening is disclosed. The roof arrangement has a movable roof element for selectively closing or at least partially opening the roof opening. Furthermore, the roof arrangement has a frame which holds the roof element. The roof arrangement has a strand-shaped seal profile which extends in a horizontal main direction of extent, it being possible for the strand-shaped seal profile to be fastened to the vehicle roof, and the said strand-shaped seal profile having a first seal hose. The first seal hose is configured for sealing with respect to the movable roof element. The frame has an uppermost web. The first seal hose is arranged above the uppermost web in a state of the roof arrangement in which it is mounted for proper operation on the vehicle roof. The first seal hose has a drain lip which extends along a vertical direction from the seal hose as far as below the uppermost web of the frame.

The extent of the drain lip as far as below the uppermost web does not necessarily mean that the drain lip has to end spatially directly below the uppermost web. Rather, this includes the drain lip reaching as far as below a horizontal plane which is defined by way of an underside of the uppermost web. In other words, the drain lip and the uppermost web, if they were projected in a common horizontal plane, do not have to overlap.

In a state in which it is mounted for proper operation, the strand-shaped seal profile is fastened to the vehicle roof and seals the transition between the movable roof element and the vehicle roof in a closed state, in which the roof element closes the roof opening. Water which nevertheless passes between the seal profile and the roof element into an interior space is guided into a water guide channel of the frame. In order that penetrating water is guided as completely as possible in the said water guide channel and can be discharged in a controlled manner, without passing into a dry region of the vehicle or the roof arrangement, the first drain lip is provided.

The first drain lip is configured in such a way that it runs from the first seal hose as far as below the uppermost web of the frame. As a result, the drain lip forms a type of "water curtain". Therefore, merely a single drain lip is required which can discharge water which penetrates into the roof system into the wet region provided for this purpose in a defined manner. On account of the embodiment of the drain lip, the latter screens penetrating water off from the dry region on account of its elongate configuration in all functional positions of the roof (if the vehicle is horizontal and/or in an oblique position). In addition, the lip makes it possible for the seal to fulfil the desired functions in a very wide variety of tolerance positions. The described seal profile therefore affords the advantages that penetrating water or water droplets drain directly at the location of the penetration via the drain lip and are neither guided in parallel along the drain lip nor able to creep around the latter and pass to regions in which water is not desired.

A further advantage consists in that the seal profile is suitable for a multiplicity of roof arrangements with movable roof elements. Roof arrangements differ, for example, by way of the specific embodiments of the roof panel, the sliding roof, etc. Furthermore, curvature differences between the roof panel and the guide rail, for instance on account of slight adaptations in the case of what are known as carry-over situations which occur specifically in the panorama sliding roof region for use during the adaptation of a product to different vehicles, lead to different installation conditions and therefore tolerance conditions. This leads to the different spacings between the roof panel and the frame element, which spacings are compensated for by way of the described seal profile.

The drain lip is an element which protrudes or projects from the first seal hose and is set up such that a droplet which adheres to it, in particular a water droplet, can drain or run off from the seal profile in a defined manner. For example, this is an element which is at least partially wedge-shaped or tapering in cross section. The drain lip optionally has a breakaway edge, drain tip or the like. The extent as far as below the uppermost web means, for example, that a free end, for instance a tip, of the drain lip is arranged below the uppermost web. The drain lip is preferably of elongate, projecting configuration. The web is preferably a horizontal rib of a guide rail or a guide rail web. The drain lip is arranged between the movable cover element and the frame, in particular in an unloaded state, in which the said drain lip has no contact with other components.

The seal profile can also be called a roof cut-out seal for a vehicle. It is, for example, a single-piece seal profile. The seal profile is produced, for example, using the extrusion method and has a constant cross section. The seal profile is preferably manufactured in one piece or integrally. A seal hose is understood to mean a section of the seal profile, which section forms a cavity. Here, a seal hose does not necessarily have to be circular, but rather can also have different, channel-like or hose-like shapes. The seal hose can also be called a hollow chamber or primary hollow chamber. For example, the seal profile comprises two or more different materials. For example, at least sealing sections of the seal hoses are manufactured from foamed and/or soft rubber, rubber-type or rubber-like material, whereas other sections of the seal profile are manufactured from harder material, in particular rubber-like material or rubber material. The sealing sections are regions of the sealing hoses, which regions face the surfaces or elements to be sealed and are in contact with the latter at least in a state for proper operation. As a result, for example, a sprung action of the seal hoses is achieved. Exemplary materials are EPDM, sponge rubber, NBR or silicone rubber.

By virtue of the fact that the long drain lip projects beyond the uppermost (guide rail) web, water which has penetrated would have to flow upwards counter to gravity in order to pass via the uppermost web into a dry region of the roof arrangement or of a vehicle. The projecting of the drain lip also makes it more difficult for the water to adhere to an underside of the upper guide rail web, with the result that further running of the water into a drive cable channel of the frame element or the guide rail is prevented. The use of butyl and the use of an additional component such as what is known as a water chute can be avoided by virtue of the fact that water cannot pass onto the uppermost web, but is blocked off by way of the drain lip. By virtue of the fact that merely one drain lip is provided, the water which has penetrated cannot adhere to an edge or another element which is arranged close to the first lip. Relatively great water accumulations which can lead, for example, to an unpredictable drain behaviour are avoided.

In accordance with one embodiment, the drain lip is arranged spaced apart from the uppermost web. In other words, the drain lip extends past and around the web at a predefined spacing. The drain lip therefore has no contact area with the frame and/or the uppermost web. The spacing is, for example, greater than a typical water droplet size of approximately from 2 to 4 mm. As a result of the spacing from the frame and/or the uppermost web, it is not possible that water which has penetrated can pass from the drain lip to the uppermost web and therefore into a dry region. The drain lip is therefore formed in such a way that it is not pressed and/or its position is not changed by the guide rail, even in tolerance positions. This is due to the fact that the drain lip is decoupled substantially from an installed situation.

In accordance with one embodiment, a free end region of the drain lip is of curved or arched configuration and, at least below the uppermost web, points in a direction away from the movable roof element. In other words, a main extent or expanse direction of the drain lip in the free end region has an arched or curved profile. For example, the free end region has an acute angle of at least 15°, preferably at least 20°, with respect to the vertical direction. For example, the free end region is arranged at an angle with respect to the vertical in a direction which faces away from the roof system. This contributes to water which has penetrated tending, even in an oblique position of a vehicle, for example 15° with respect to the horizontal, to adhere on that side of the drain lip which faces the roof opening and/or the movable roof element. This contributes to it being possible for water droplets to swing around the drain lip and therefore to pass into a dry region, in particular onto the uppermost web. A further advantage of the curved or angled embodiment lies in the fact that, in the case of a possible contact with a mechanism for opening the movable roof element, for instance with a pin, the lip of particularly long configuration is pressed upwards in a defined manner and jamming is prevented. The entire drain lip preferably has a curved or arched profile at least in sections.

In accordance with one embodiment, the first seal hose merges seamlessly into the first drain lip on a side which faces the movable roof element. This means that a transition from the first seal hose to the arranged drain lip has a steady profile. In other words, a smooth contour is formed. This contributes to it being possible for water to pass without obstruction directly to the drain lip in a defined manner.

In accordance with one embodiment, the drain lip has a steady, for instance tangentially constant, profile at least on the side which faces the movable roof element. On the side which faces the movable roof element, the seal hose and the drain lip which is arranged thereon preferably have a steady profile and therefore a steadily running contour. The seal hose and the drain lip preferably have a curved or arched profile at least in sections. This firstly contributes to, as has already been mentioned above, it being possible for water droplets to drain directly and rapidly via the drain lip and it being impossible for any water accumulations to be formed. Secondly, painting of the drain lip and/or the seal hose is simplified, the paint typically being applied on the side which faces the movable roof element. In particular, what is known as a bonded coating is applied which contributes to minimizing static friction forces between the components which are involved.

In accordance with one embodiment, the drain lip has a notch on a side which faces the frame, in a transition region in which the drain lip is connected to the first seal hose. The notch is therefore provided on a side which faces away from the movable roof element. The transition region is the region in which the drain lip is attached on the first seal hose. The said region can also be called an attaching region of the drain lip. The provision of the notch makes defined folding or buckling of the drain lip possible. This is advantageous if the drain lip comes into contact with other elements, such as the abovementioned mechanism for opening the movable roof element. It is thus conceivable, for example, that a pin is displaced along the drain lip with the formation of contact with the latter in the guide rail, and in the process presses the drain lip in the direction of the frame.

In accordance with one embodiment, a transition region, in which the drain lip is connected to the first seal hose, is configured as a folding hinge. The advantages and functions which are described in the above paragraph are achieved by way of the configuration as a folding hinge. The notch is, for example, part of a folding hinge of this type.

A contribution is made, in particular in combination with the above-described curvature or angular configuration of the lip, to the drain lip being folded over in a defined manner in all tolerance positions and, for example, to an undesired development of noise being avoided. In particular, with or without a curved or angular embodiment, the folding hinge makes it possible that a cover lower handle of the movable roof element folds over or bends over the drain lip in a defined manner in the case of closure of the roof system.

In accordance with one embodiment, the strand-shaped seal profile has a second seal hose which is connected to the first seal hose, the second seal hose being arranged on the frame and being configured to seal the frame with respect to the vehicle roof.

The two seal hoses are connected, for example, via a connecting web. The connecting web comprises, for example, a stiffer and/or harder material in comparison with the sealing sections of the seal hoses. The connecting web does not necessarily consist of the same material as the seal hoses. The connecting web can also be part of one or both seal hoses. The seal profile is typically attached on the roof panel of a vehicle, which roof panel delimits the roof opening, the second seal hose being arranged between the roof panel and the frame element. In particular, the second seal hose is squeezed and thus seals towards the frame element. The second seal hose is configured to seal the frame towards the vehicle roof, primarily against noise emissions and against dust, but also against water towards the dry region.

The second seal hose can be called a second hollow chamber or a secondary hollow chamber in an analogous manner with respect to the first seal hose. The drain lip on the first seal hose contributes to it not being possible for water to pass to the second seal hose which is arranged on the frame. The drain lip is decoupled kinematically from the second seal hose, with the result that the position of the drain lip can be reproduced in all installed situations and therefore makes a considerable contribution to the robustness of the overall roof system. In particular, it shields the uppermost guide rail web and therefore the dry region reliably in every installed and tolerance position. A further advantage lies in the fact that a risk of jamming during the installation or mounting of the seal profile with other components can be ruled out. In particular, the transition region to the second seal hose and the second seal hose itself can be formed in a correspondingly elastic manner, such that reliable mounting is ensured in all tolerance positions.

As an alternative, the second seal hose can also be part of a further seal profile which is configured separately from the first above-described seal profile. The first seal profile and the second seal profile are therefore discrete components which can be mounted independently of one another. This makes separate mounting and production possible. A decoupling of this type makes it possible for the sealing action with respect to the frame to take place reliably, regardless of a curvature of the frame and a curvature of the vehicle roof. In particular, the frame and the vehicle roof can have different curvatures, with the result that a spacing between the frame and the vehicle roof changes at least in sections.

In accordance with a further aspect, a vehicle roof of a vehicle is disclosed. The vehicle roof has a roof opening and a roof arrangement in accordance with an above-described embodiment. The roof arrangement is arranged in an edge region of the roof opening. The strand-shaped seal profile is fastened to the vehicle roof, and the frame is coupled to the vehicle roof. The abovementioned advantages and functions are substantially made possible as a result.

Further advantages and functions are disclosed in the following, detailed description of one exemplary embodiment. The exemplary embodiment will be described in the following text with the aid of the appended figures. Identical or identically acting elements are provided in all figures with the same reference signs.

Figure 1:
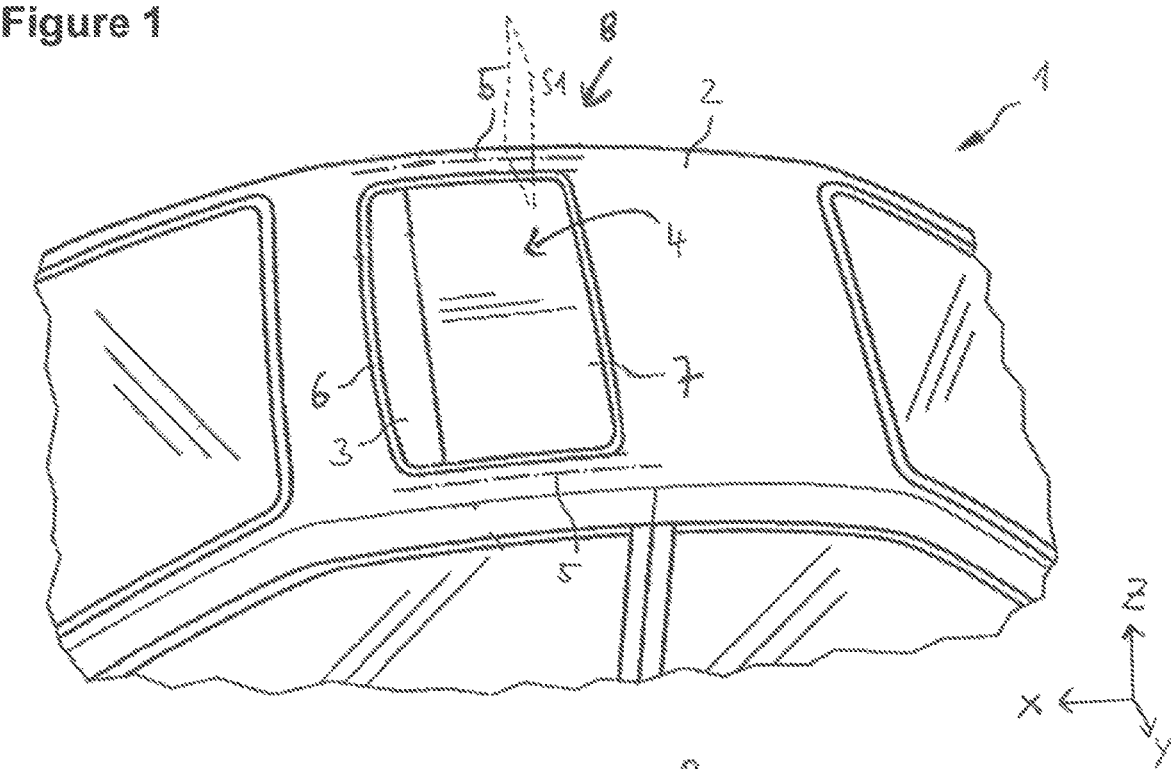
FIG. 1 shows a diagrammatic view of a vehicle.

FIG. 1 diagrammatically shows a vehicle 1 with a vehicle roof 2. The vehicle roof 2 is, in particular, the roof which is fixed to the vehicle and is also called a roof panel. The vehicle roof 2 surrounds a roof opening 3. The roof opening 3 can be selectively closed or at least partially opened by means of a movable roof element 4 which can be displaced along a vehicle longitudinal axis.

The movable roof element 4 (also called a cover) is held by a frame 5. The frame 5 has, for example, guide rails which are fastened to the vehicle roof 2 on both sides of the roof opening 3. The frame 5 has, in particular, further elements which are arranged, for example, transversely with respect to the X-direction on a front side 6 of the roof opening 3. The front side 6 is arranged so as to lie opposite a rear side 7 of the roof opening 3. The front side 6 and the rear side 7 are delimited by a front edge and a rear edge, respectively, of a vehicle roof cut-out which delimits the roof opening 3. The frame 5 serves, in particular, to guide the movement of the roof element 4 and to hold further elements, such as drive motors and/or drive cables. The roof element 4 and the frame 5 are, in particular, part of a roof arrangement 8 which can be used as an independent assembly with the vehicle roof 2.

Statements of location or direction which are used, such as "at the rear" or "in front", relate to a vehicle longitudinal axis and a customary driving direction of a motor vehicle which is ready for operation. The vehicle longitudinal axis can also be called a horizontal axis or X-axis in an associated X-direction (see the illustrated coordinate system in the figures). Statements which are used such as "above" or "below" relate to the Z-direction in a state of the vehicle in which it is ready for operation.

Figure 2:
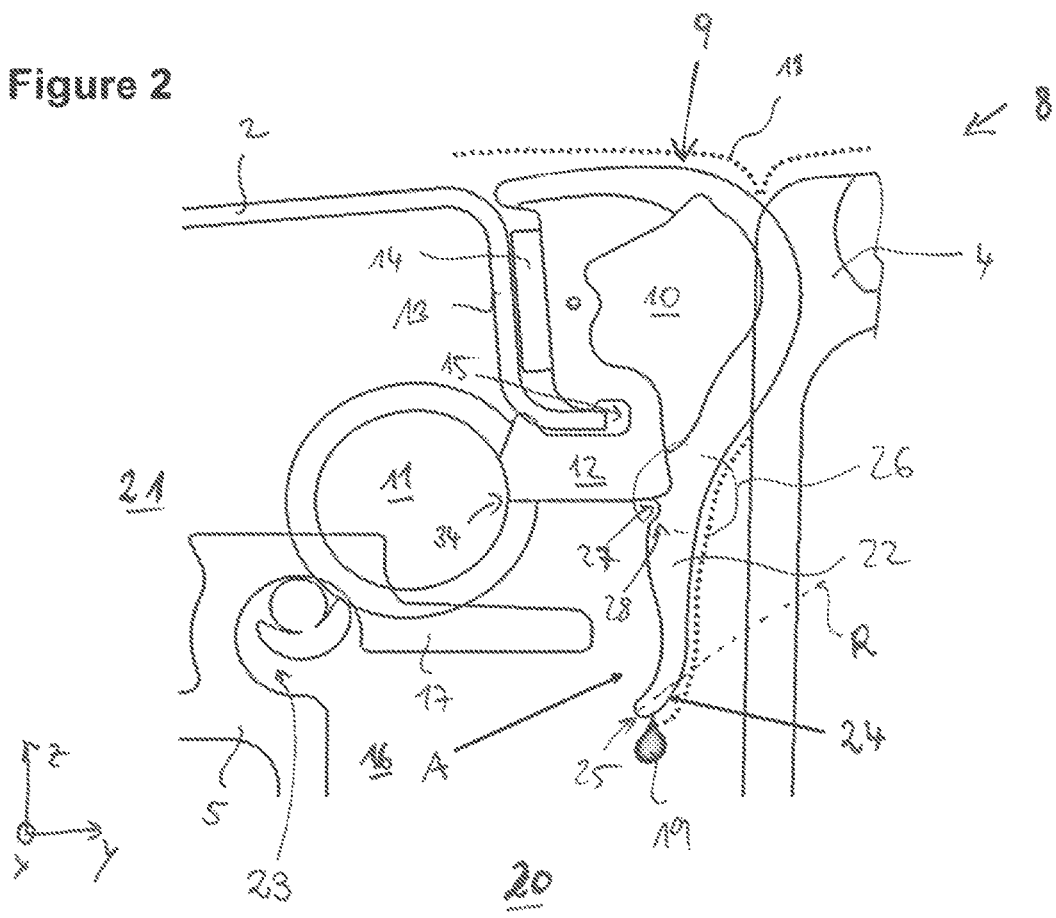
FIGS. 2 to 5 show diagrammatic cross-sectional views of a roof arrangement of the vehicle roof in accordance with one exemplary embodiment in different installed situations.

FIG. 2 shows a diagrammatic sectional view of the vehicle 1 along an exemplary sectional plane S1 (FIG. 1). In addition to the movable roof element 4 and the frame 5, the roof arrangement 8 has a strand-shaped seal profile 9. The seal profile 9 is formed by way of a first seal hose 10 and a second seal hose 11 which are connected to one another via a connecting web 12. The seal profile 9 is elastically resilient, in a sprung manner. The seal profile 9 extends along a horizontal main direction of extent along the roof opening 3, that is to say in the X-direction or Y-direction. Along the main direction of extent, the seal profile 9 is in each case of longer configuration than in the two other directions perpendicular with respect to the main direction of extent.

In a section which delimits the roof opening 3, the vehicle roof 2 has a stamped section 13, to which the seal profile 9 is fastened on the vehicle roof 2 via an adhesive bond 14 and a positively locking plugged connection by means of a cut-out 15. Other fastening methods are likewise conceivable.

The frame 5 has a guide rail 16, an uppermost web 17 which can also be called a guide rail web being provided.

FIG. 2 shows the seal profile 9 in the original dimensions before it is actually in the state which is ready for operation, in particular is squeezed and braced. In particular, the second seal hose 11. The first seal hose 10 is configured for sealing with respect to the movable roof element 4 and the vehicle roof 2. The second seal hose 11 is configured for sealing between the vehicle roof 2 and the frame 5, in particular the uppermost web 17. In accordance with FIG. 2, the first seal hose 10 is arranged substantially along a Y-direction between the vehicle roof 2 and the movable roof element 4. In accordance with FIG. 2, the second seal hose 11 is arranged along a Z-direction between the frame 5 and the vehicle roof 2. In the state in which they are ready for operation, are squeezed and are installed, the seal hoses 10 and 11 of the seal profile 9 are intended to prevent the penetration of water and/or dust and noise.

In the case of a closed vehicle roof 2, that is to say when the movable roof element 4 is arranged completely in the roof opening 3, the first seal hose 10 seals the transition between the vehicle roof 2 and the roof element 4 as far as possible. Nevertheless, water 18 (dotted line) can pass in the direction of the vehicle interior counter to the Z-direction. As will be explained in still greater detail, the said water 18 is guided in a controlled manner by way of draining (see water droplet 19) in a wet region 20 by means of a drain lip 22 which is arranged on the first seal hose 10, and is discharged from there in a targeted manner via a water guide channel (not shown). It can therefore be prevented or it can at least be prevented as far as possible that water 18 passes into a dry region 21 and/or a drive cable channel 23 of the frame 5.

The seal profile 9 is manufactured from rubber or rubber-like materials. The seal profile 9 has, for example, one or more unfoamed or relatively firm and relatively rigid part profiles, and one or more foamed part profiles which are lighter and softer. For example, solid rubber is used for the relatively firm material, whereas sponge rubber is used for the softer more elastic material. The solid rubber is, for example, unfoamed rubber or hard rubber. Other material combinations are likewise conceivable, however.

In order to achieve the advantages and functions mentioned at the outset during the targeted discharge of water and prevention of the penetration of water into the dry region 21, the seal profile 9 is of special configuration, as described in the following text. In a state in which it is mounted for proper operation, the first seal hose 10 is arranged above the uppermost web 17. In addition, the drain lip 22 shaped in an elongate manner, which extends from the first seal hose 10, is configured in such a way that it extends substantially along a vertical direction (Z-direction) as far as a height below the uppermost web 17. Here, however, the drain lip 22 is arranged spaced apart (spacing A) from the uppermost web 17 and does not form a contact area or touching area with the latter.

Furthermore, the drain lip 22 has a slightly arched or curved profile. In particular, a free end region 24 of the drain lip 22, which end region 24 is arranged below the uppermost web 17, is curved or arched in such a way that the free end region 24, in particular a tip 25 of the drain lip 22, points in a direction away from the movable roof element 4. In other words, the free end region 24 is oriented at an acute angle of at least 15°, preferably at least 20°, with respect to the vertical direction (Z-direction), reference being made to a main direction of extent R of the free end region 24.

Furthermore, a seamless transition is configured between the first seal hose 10 and the drain lip 22, with the result that the drain lip and the first seal hose have a steady contour profile at least on the side which faces the movable roof element 4.

The described configuration of the drain lip 22 ensures that water 18 which has penetrated can be discharged as rapidly as possible along the direction of gravity into the wet region 20.

Furthermore, the drain lip 22 has a notch 27 as part of a folding hinge 28 in an attaching or transition region 26, in which the drain lip 22 is connected to the first seal hose 10. The notch 27 and the folding hinge 28 are arranged and configured in such a way that, in the case of contact from below with a further element, the drain lip 22 can fold together in a predefined direction in the direction of the frame or second seal hose 11 in a predefined and desired way.

Figure 3:
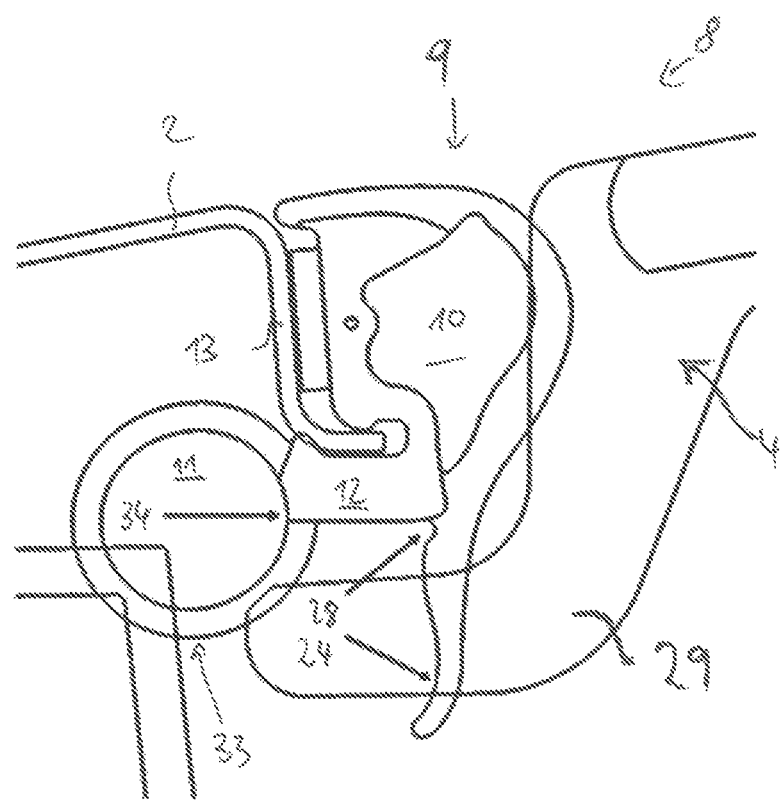
Figure 4:
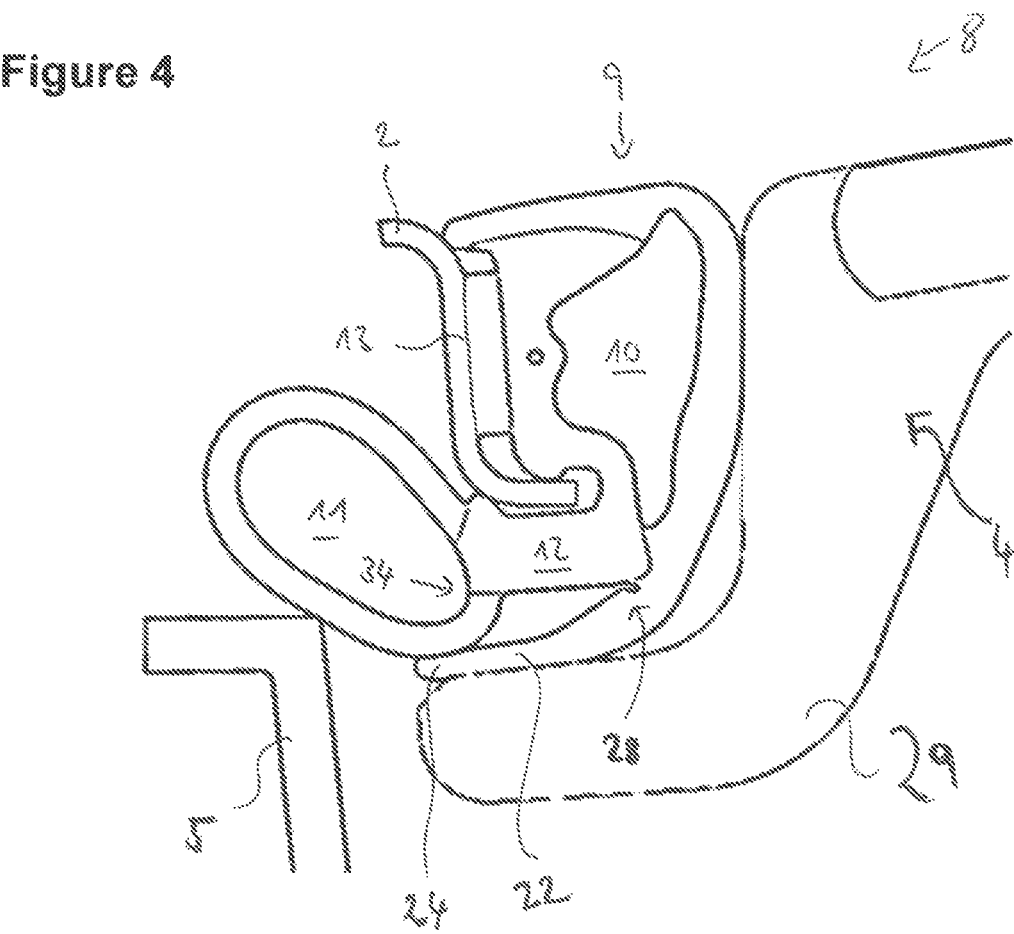

The described, defined folding together is advantageous, in particular, for what is known as a cover lower handle 29 which is arranged on the movable roof element 4 on the side which faces the front side 6. This is shown by way of example in FIGS. 3 and 4, FIG. 3 showing the actual extent of the seal profile 9 and therefore an overlap with the other components, whereas FIG. 4 shows an actual squeezed state. It is to be noted that not all reference signs from FIG. 2 are also illustrated in the further FIGS. 3 to 5.

Figure 5:
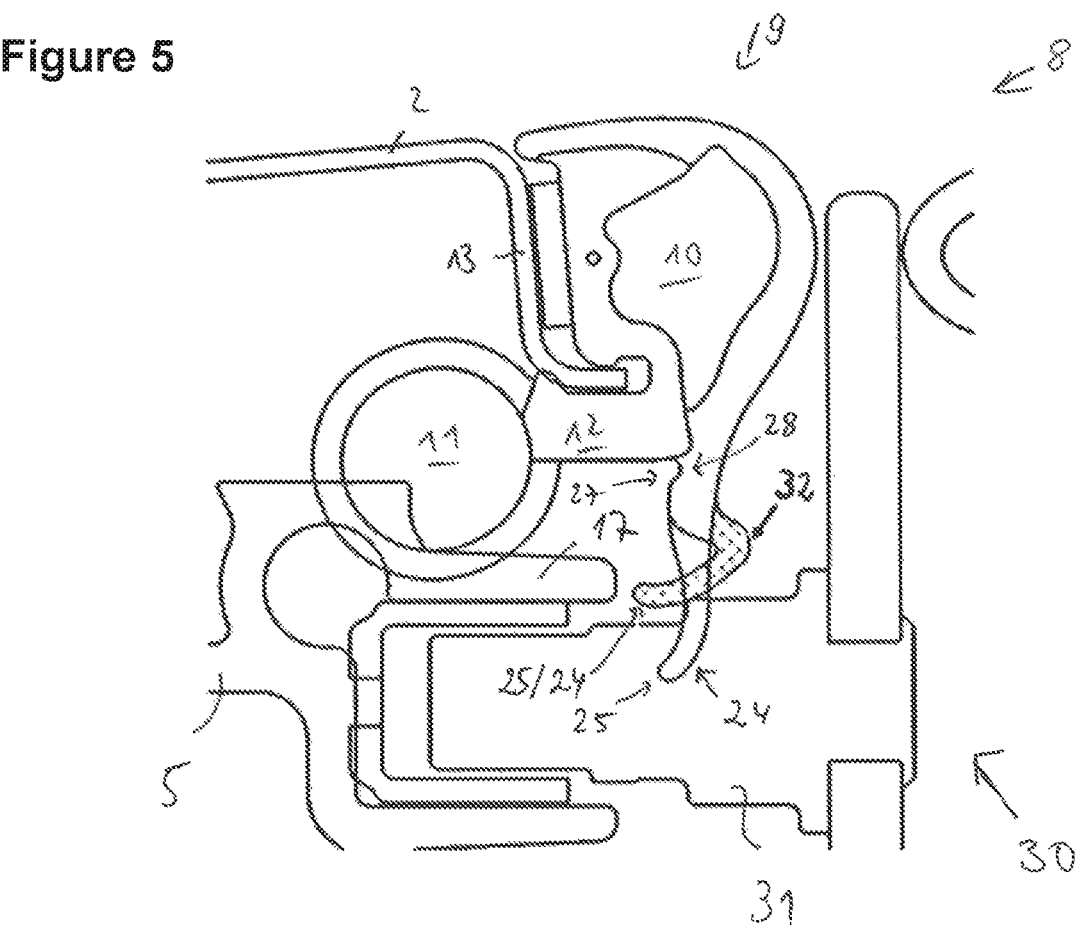

In the case of the closure of the roof opening 3, the roof element 4 closes in such a way that the cover lower handle 29 is moved from below under the vehicle roof 2, in particular the stamped section 13. In the closed state which is shown in FIG. 4, the cover lower handle 29 squeezes from below against the seal profile 9. Here, the drain lip 22 is bent over in a predefined manner by means of the folding hinge 28. In this state, the free end region 24 of the drain lip 22 points clearly in the direction of the frame 5. The frame 5 does not have a guide rail for a mechanism of the movable roof element 4 along the front side 6 and along the rear side 7, and is therefore of different configuration in the side regions, as shown in FIGS. 2, 5 and 6. In addition to the folding hinge 28, the curved configuration of the drain lip 22, as described above, also helps the said defined folded-over state (as shown in FIG. 4) to be achieved.

FIG. 5 shows a further installed situation of the seal profile 9, an opening mechanism 30 with a sliding pin 31 being shown in the case of an at least partially open state of the movable roof element 4. The seal profile 9 is shown in its extent before the installation and operationally ready state in a non-hatched version, whereas the drain lip 22 is also shown in a squeezed actual state in a hatched form.

As a result of the above-described curved shape and angular configuration of the drain lip 22, the latter can buckle in a predefined manner (as shown in the hatched version) in the case of contact with the pin 31, with the result that a bulbous kink 32 is configured in the direction of the movable roof element 4 (not shown). Even in the said buckled state, the drain lip 22 is at a predefined spacing from the uppermost web 17.

The described seal, that is to say the seal profile 9, makes the advantages and functions which were mentioned at the outset possible. Water 18 which penetrates into the roof arrangement 8 cannot pass to the uppermost web 17 under normal operating conditions and therefore cannot run over into the dry region 21. It is prevented, furthermore, that water passes into the drive cable channel 23 which can also be a part of the dry region. By virtue of the fact that the drain lip 22 is configured to be so long that it protrudes beyond the uppermost guide rail web 17, water would have to flow upwards counter to gravity, in order to pass into the dry region. On account of the above-described angle of 15° or more than 20° with respect to the vertical direction, water cannot swing around the lip and pass into the dry region and/or the drive cable channel 23, even in the case of an oblique position of 15° of the vehicle 1. In the case of the described concept, merely a single drain lip 22 that extends in an elongate manner is necessary, which screens the penetrating water off from the dry region in all functional positions of the roof arrangement and the vehicle.

Furthermore, jamming or pinching of the drain lip 22 is ruled out in the case of contact with the mechanism, in particular with the pin 31, which mechanism is situated below the uppermost guide web 17.

A further advantage consists in that the drain lip 22 is not in direct contact with the second seal hose 11, with the result that squeezing of the seal hose 11 (not shown in FIGS. 2, 3 and 5, shown in FIG. 4) does not have any effects or has at least only unsubstantial effects on a position of the drain lip 22 itself. Therefore, the drain lip 22 is substantially decoupled from the second seal hose 11.

The described seal profile 9 is also suitable for use in multiple projects, since different installation space situations and tolerance conditions are compensated for particularly satisfactorily.

A further advantage can be seen from FIG. 3, from which it can be seen that a transition of the connecting web 12 which is typically manufactured from a very hard rubber material such as solid rubber to the softer and more elastic material of the second seal hose 11 is as far away as possible from an underside 33 of the seal hose 11. In other words, a transition region 34 from the connecting web 12 to the second seal hose 11 is arranged as high up as possible in relation to the Z-direction. As a result, a risk of jamming with other components is substantially ruled out. This means that, in the case of mounting in which the hard part of the connecting web 12 is substantially not elastically resilient, sufficiently elastic material is available by way of the second seal hose 11, in order to ensure correct and secure, sealing mounting.

LIST OF REFERENCE SIGNS

1 Vehicle
2 Vehicle roof
3 Roof opening
4 Roof element
5 Frame
6 Front side
7 Rear side
8 Roof arrangement
9 Seal profile
10 Seal hose
11 Seal hose
12 Connecting web
13 Stamped section
14 Adhesive bond
15 Cut-out
16 Guide rail
17 Uppermost web
18 Water
19 Water droplet
20 Wet region
21 Dry region
22 Drain lip
23 Drive cable channel
24 End region
25 Tip
26 Transition region
27 Notch
28 Folding hinge
29 Cover lower handle
30 Opening mechanism
31 Sliding pin
32 Kink
33 Underside
34 Transition region
A Spacing
R Main direction of extent

The invention claimed is:

1. A roof arrangement for a vehicle roof having a roof opening, comprising:
   a movable roof element for selectively closing or at least partially opening the roof opening,
   a frame which holds the roof element, and
   a strand-shaped seal profile which extends in a horizontal main direction of extent (X, Y), it being possible for the strand-shaped seal profile to be fastened to the vehicle roof, and the strand-shaped seal profile having a first seal hose, the first seal hose being configured for sealing with respect to the movable roof element,
   the frame having an uppermost web with an upper surface portion unsealed by a drain lip,
   the first seal hose being arranged above the uppermost web in a state of the roof arrangement in which it is mounted on the vehicle roof, and the first seal hose having a drain lip which extends along a vertical direction from the seal hose at a predetermined distance away from the uppermost web of the frame as far as below the uppermost web of the frame.

2. The roof arrangement according to claim 1, wherein a free end region of the drain lip is of a curved or arched configuration and, below the uppermost web, pointing in a direction away from the movable roof element.

3. The roof arrangement according to claim 2, wherein the free end region is at an acute angle of at least 15 degree, preferably at least 20 degree, with respect to the vertical direction.

4. The roof arrangement according to claim 1, wherein the first seal hose merges seamlessly into the first drain lip on a side which faces the movable roof element.

5. The roof arrangement according to claim 1, wherein the seal profile and the drain lip define a smooth exterior profile at least on the side which faces the movable roof element.

6. The roof arrangement according to claim 1, wherein the drain lip has a notch on a side which faces the frame, in a transition region in which the drain lip is connected to the first seal hose.

7. The roof arrangement according to claim 1, wherein a transition region in which the drain lip is connected to the first seal hose is configured as a folding hinge.

8. The roof arrangement according to claim 1, wherein the strand-shaped seal profile has a second seal hose which is connected to the first seal hose, the second seal hose being arranged on the frame and being configured to seal the frame with respect to the vehicle roof.

9. A vehicle roof of a vehicle, comprising a roof opening and a roof arrangement according to claim 1, wherein the roof arrangement is arranged in an edge region of the roof opening, and the strand-shaped seal profile is fastened to the vehicle roof, and the frame is coupled to the vehicle roof.

10. The roof arrangement according to claim 1, wherein the predetermined distance is greater than a water drop size of about 2 to 4 mm.

* * * * *